United States Patent
Yeh (10) Patent No.: US 9,164,304 B2
(45) Date of Patent: Oct. 20, 2015

(54) LIQUID CRYSTAL DISPLAY ASSEMBLY AND ELECTRONIC DEVICE

(71) Applicant: HTC Corporation, Taoyuan County (TW)

(72) Inventor: Chih-Shan Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 218 days.

(21) Appl. No.: 13/944,885

(22) Filed: Jul. 18, 2013

(65) Prior Publication Data
US 2015/0022752 A1    Jan. 22, 2015

(51) Int. Cl.
*G02F 1/1333* (2006.01)

(52) U.S. Cl.
CPC .................. *G02F 1/133308* (2013.01)

(58) Field of Classification Search
CPC .................................................. G02F 1/133308
USPC .......................................................... 349/58
See application file for complete search history.

(56) References Cited

U.S. PATENT DOCUMENTS

| | | | |
|---|---|---|---|
| 7,944,523 B2 | 5/2011 | Kwak et al. | |
| 8,059,227 B2 | 11/2011 | Shin | |
| 2004/0057218 A1 | 3/2004 | Wu et al. | |
| 2004/0125312 A1* | 7/2004 | You et al. | 349/149 |
| 2010/0245703 A1* | 9/2010 | Lin | 349/58 |
| 2012/0099044 A1 | 4/2012 | Lin et al. | |
| 2012/0314155 A1 | 12/2012 | Lo | |

FOREIGN PATENT DOCUMENTS

| | | |
|---|---|---|
| DE | 10360934 | 7/2004 |
| JP | 2004212973 | 7/2004 |
| JP | 2006084969 | 3/2006 |
| TW | 201135324 | 10/2011 |

OTHER PUBLICATIONS

"Office Action of Germany Counterpart Application", issued on Sep. 30, 2014, p. 1-p. 6.
"Office Action of Taiwan Counterpart Application", issued on Apr. 10, 2015, p. 1-p. 4.

* cited by examiner

*Primary Examiner* — Thanh-Nhan P Nguyen
(74) *Attorney, Agent, or Firm* — Jianq Chyun IP Office (57) ABSTRACT

A liquid crystal display assembly including a liquid crystal display module, a backlight assembly and a supporting frame is provided. The liquid crystal display module has a display surface. The backlight assembly has a light guide plate. The supporting frame has a top portion and a bottom portion opposite to the top portion. The light guide plate of the backlight assembly is fixed at the top portion of the supporting frame, the liquid crystal display module is stacked up on the light guide plate and is disposed on the top portion of the supporting frame, wherein a circuit board is applicable to mount to the bottom portion of the supporting frame and electrically connects to the liquid crystal display module, and the circuit board faces a rear side of the backlight assembly opposite to the display surface. An electronic apparatus including the liquid crystal display assembly is also provided.

19 Claims, 6 Drawing Sheets

LIQUID CRYSTAL DISPLAY ASSEMBLY AND ELECTRONIC DEVICE

BACKGROUND OF THE DISCLOSURE

1. Field of the Disclosure

The disclosure relates to a display assembly and an electronic device, and more particularly, to a liquid crystal display assembly and an electronic device using the same.

2. Description of Related Art

Following the rapid advance of technology and semiconductor industry, digital products such as personal digital assistant (PDA), mobile phone, smart phone and notebook computer (NB) have been more and more widely used in recent years. These digital products are being developed toward convenience in use, multi-function and aesthetic appearance to provide more chooses for users. As the users have higher and higher demand on the digital products, the display which plays an important role in the digital products has become a focus for designers, in which liquid crystal displays (LCD) have become the main stream of the displays.

Figure 1:
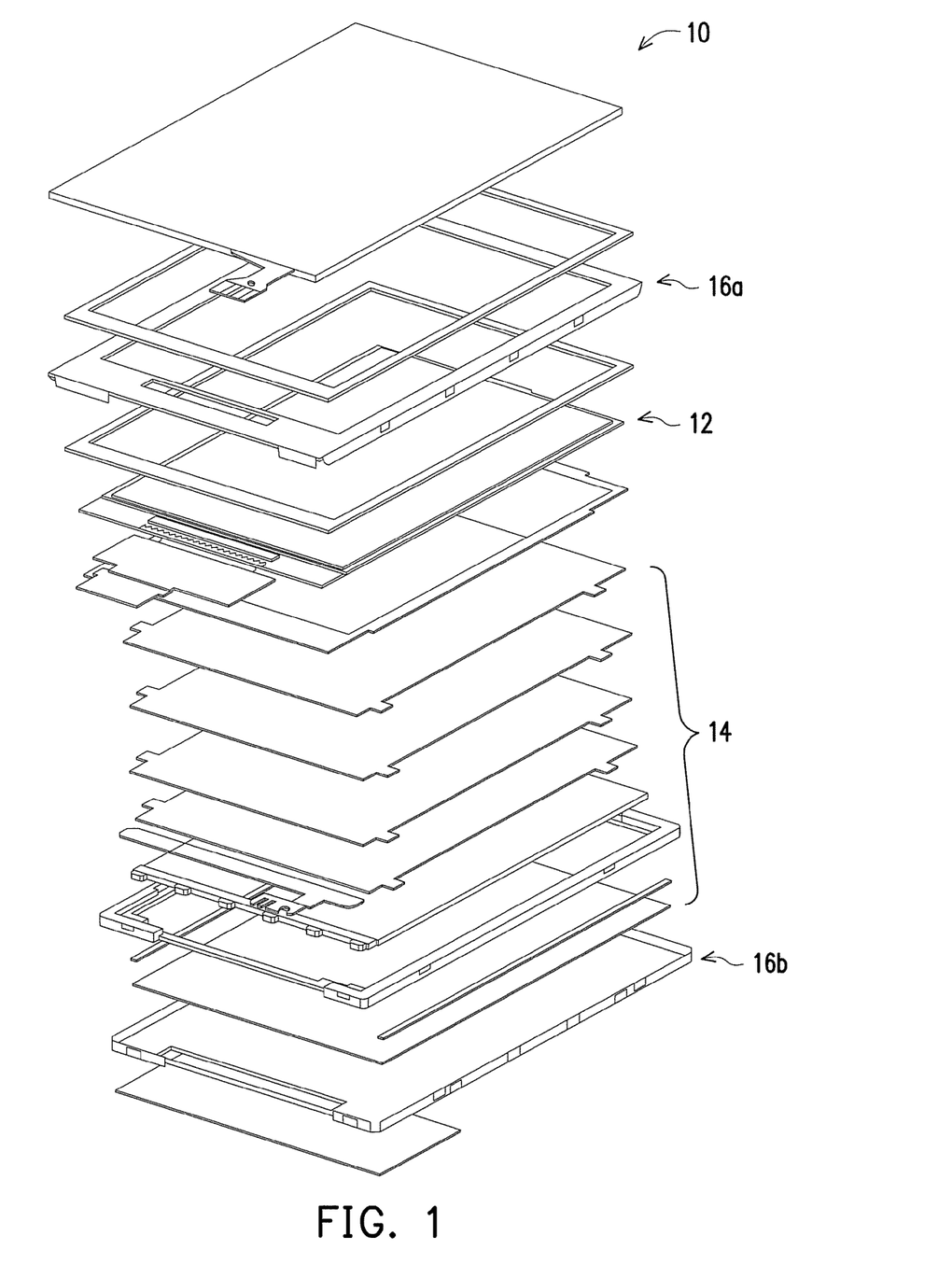
FIG. 1 is an exploded diagram illustrating a conventional liquid crystal display.

FIG. 1 is an exploded diagram illustrating a conventional liquid crystal display. Referring to FIG. 1, a liquid crystal display (LCD) 10 generally includes a liquid crystal display (LCD) panel 12, a backlight module 14 etc., in which the LCD panel 12 includes two substrates and other components located between the two substrates such as a liquid crystal layer, an electrode layer, a color filter layer, a polarizer and an alignment layer, and the backlight module 14 includes a light source, a light guide plate, optical films and other components. Accordingly, the LCD panel 12 and the backlight module 14 are often fabricated separately, and after the fabrications being completed, the LCD panel 12 and the backlight module 14 are then assembled to be the LCD 10 through the positioning frames 16a and 16b. Therefore, the positioning frames 16a and 16b utilized in the process of manufacturing and assembling the LCD 10 may affect the thickness of the LCD 10. When the manufactured LCD 10 is applied to an electronic device (not shown), other holding frames may then utilized to assemble the LCD 10 with other components (such as a circuit board or a battery), thereby affect the thickness of the electronic device.

SUMMARY OF THE DISCLOSURE

The disclosure is directed to a liquid crystal display assembly which has a relatively thin thickness.

The disclosure is directed to an electronic device which has a relatively thin thickness.

The disclosure provides a liquid crystal display assembly applicable to assemble with a circuit board. The liquid crystal display assembly includes a liquid crystal display module, a backlight assembly and a supporting frame. The liquid crystal display module has a display surface. The backlight assembly has a light guide plate (LGP). The supporting frame has a top portion and a bottom portion opposite to the top portion. The light guide plate of the backlight assembly is fixed at the top portion of the supporting frame. The liquid crystal display module is stacked up on the light guide plate of the backlight assembly and is disposed on the top portion of the supporting frame, wherein the circuit board is applicable to mount to the bottom portion of the supporting frame and to electrically connect to the liquid crystal display module, and the circuit board faces a rear side of the backlight assembly opposite to the display surface.

The disclosure provides an electronic device, which includes a housing and a liquid crystal display assembly. The housing has a mount opening. The liquid crystal display assembly is applicable to assemble with a circuit board, and is mounted into the housing. The liquid crystal display assembly includes a liquid crystal display module, a backlight assembly and a supporting frame. The liquid crystal display module has a display surface, and the display surface is exposed by the mount opening. The backlight assembly has a light guide plate. The supporting frame has a top portion and a bottom portion opposite to the top portion. The light guide plate of the backlight assembly is fixed at the top portion of the supporting frame. The liquid crystal display module is stacked up on the light guide plate of the backlight assembly and is disposed on the top portion of the supporting frame, wherein the circuit board is applicable to mount to the bottom portion of the supporting frame and to electrically connect to the liquid crystal display module, and the circuit board faces a rear side of the backlight assembly opposite to the display surface.

To recapitulate, the liquid crystal display assembly provided in the disclosure can be applied to the electronic device, in which the liquid crystal display module and the backlight assembly are disposed on the supporting frame, and the circuit board is mounted to the supporting frame and is electrically connected to the liquid crystal display module. As such, the liquid crystal display module and the backlight assembly can be fixed by the supporting frame, so as to omit using other holding frames that are configured to fix. Accordingly, the liquid crystal display assembly and the electronic device using the same have relatively thinner thicknesses.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF THE EMBODIMENTS

Figure 2A:
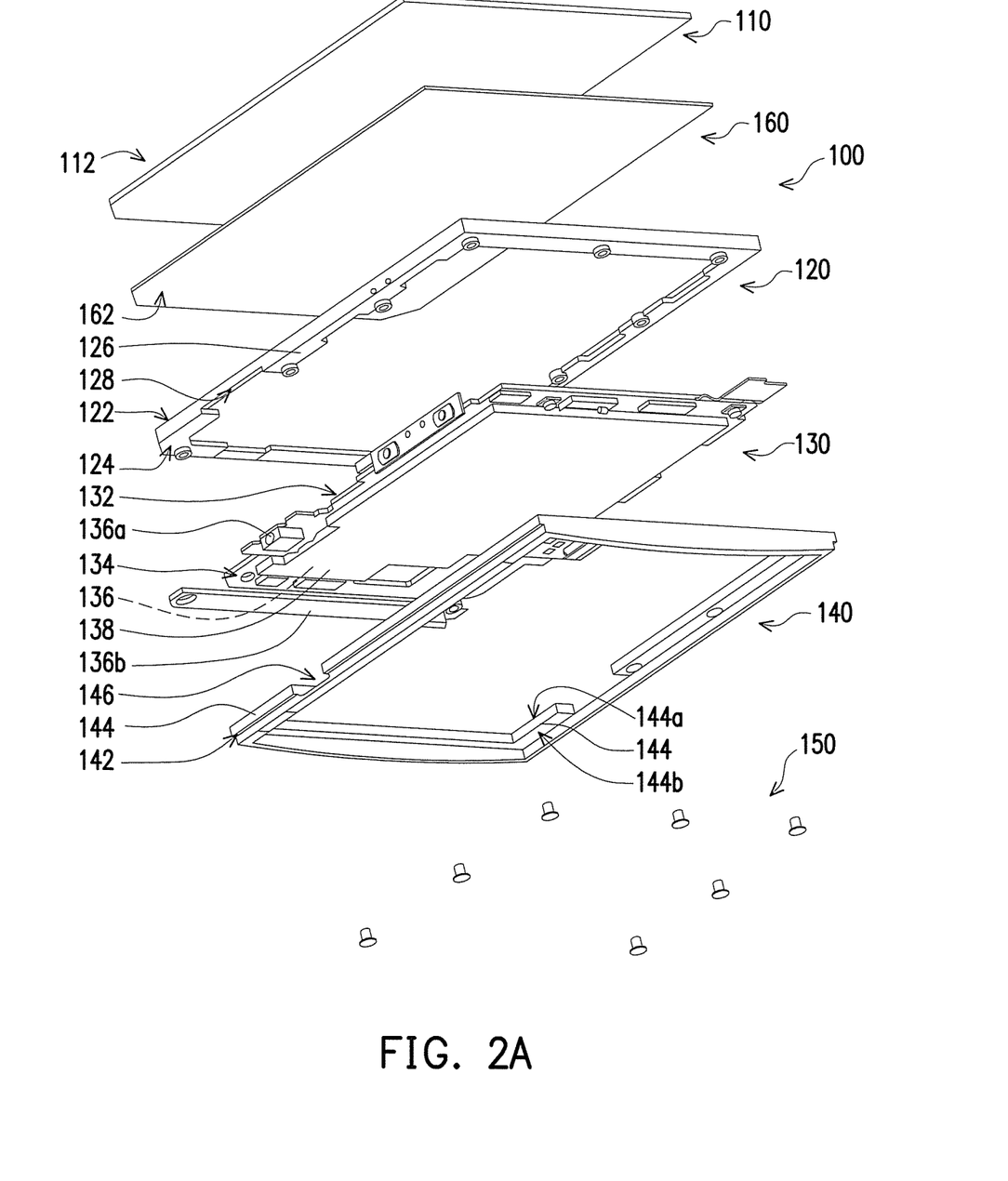
FIG. 2A is an exploded diagram illustrating a liquid crystal display assembly according an embodiment of the disclosure.
Figure 2B:
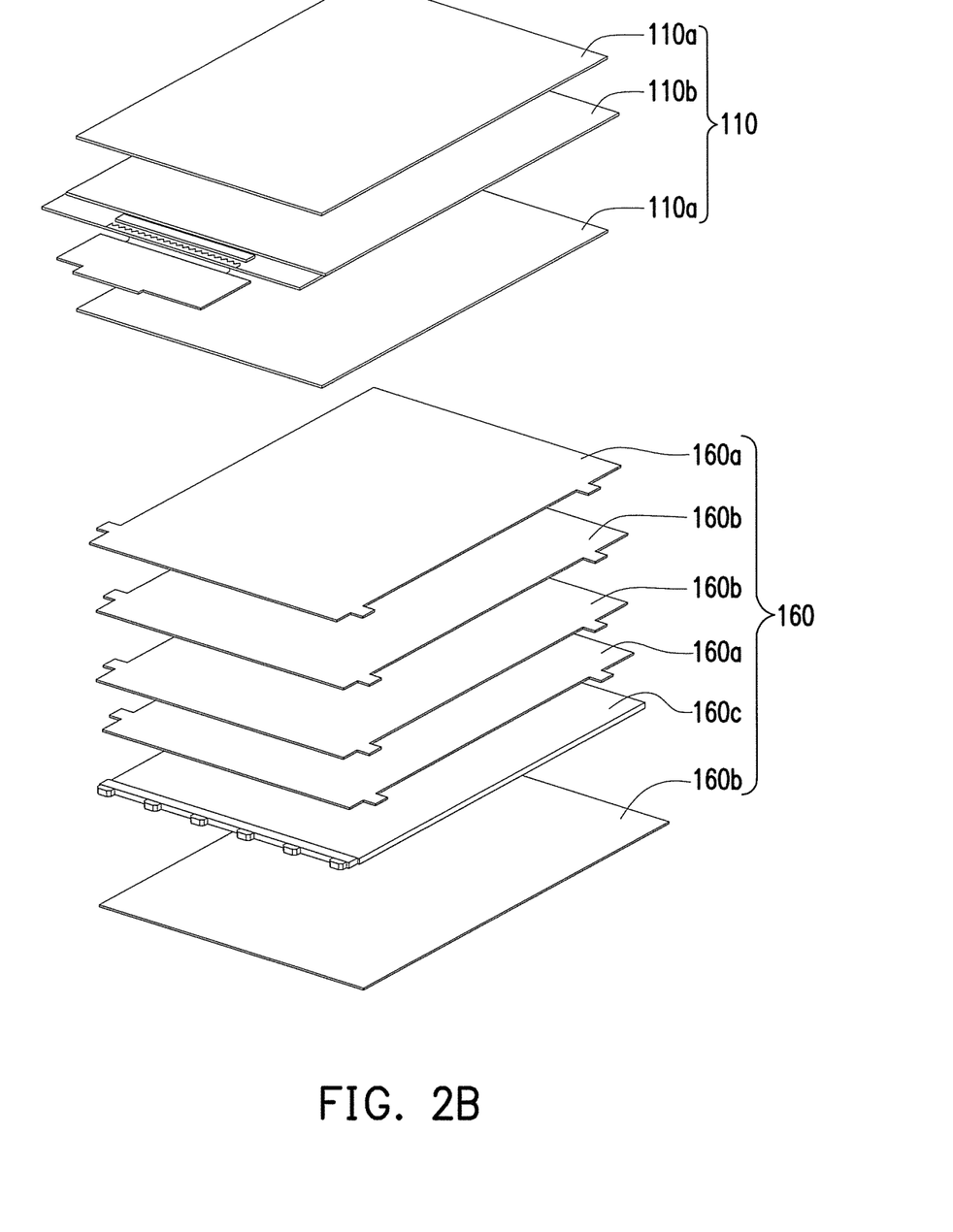
FIG. 2B is an exploded diagram illustrating an assembly of a liquid crystal display module and a backlight module depicted in FIG. 2A.
Figure 3:
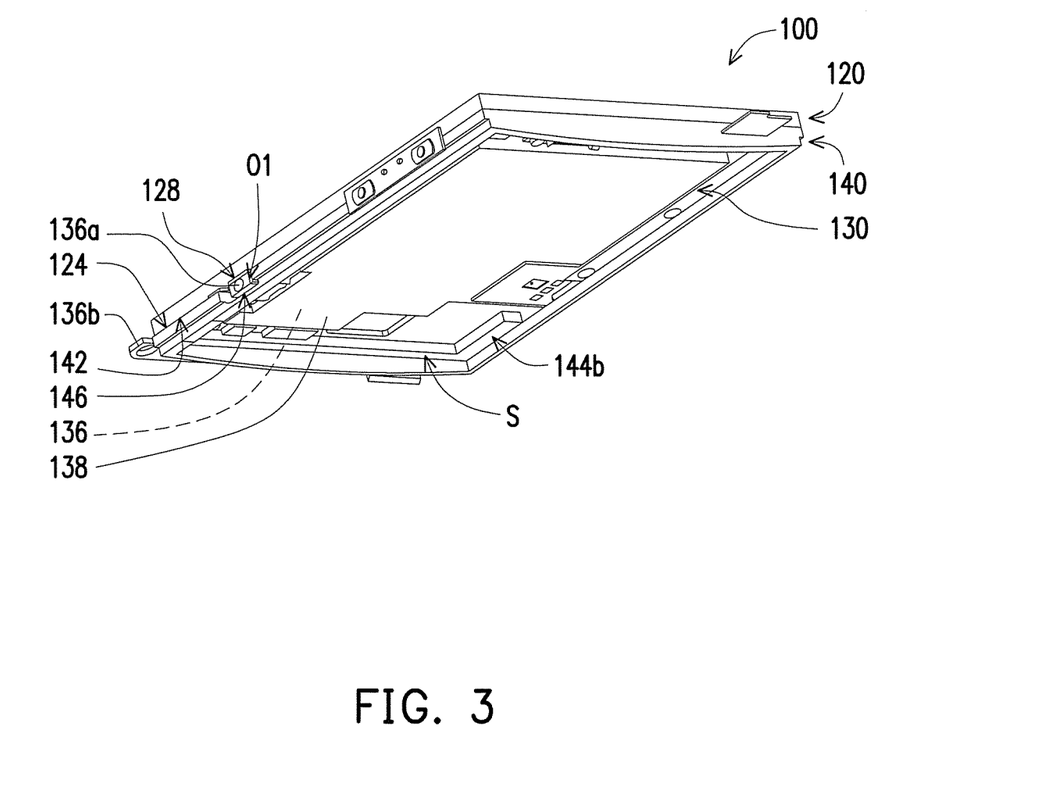
FIG. 3 is a schematic diagram illustrating the liquid crystal display assembly depicted in FIG. 2A.
Figure 4:
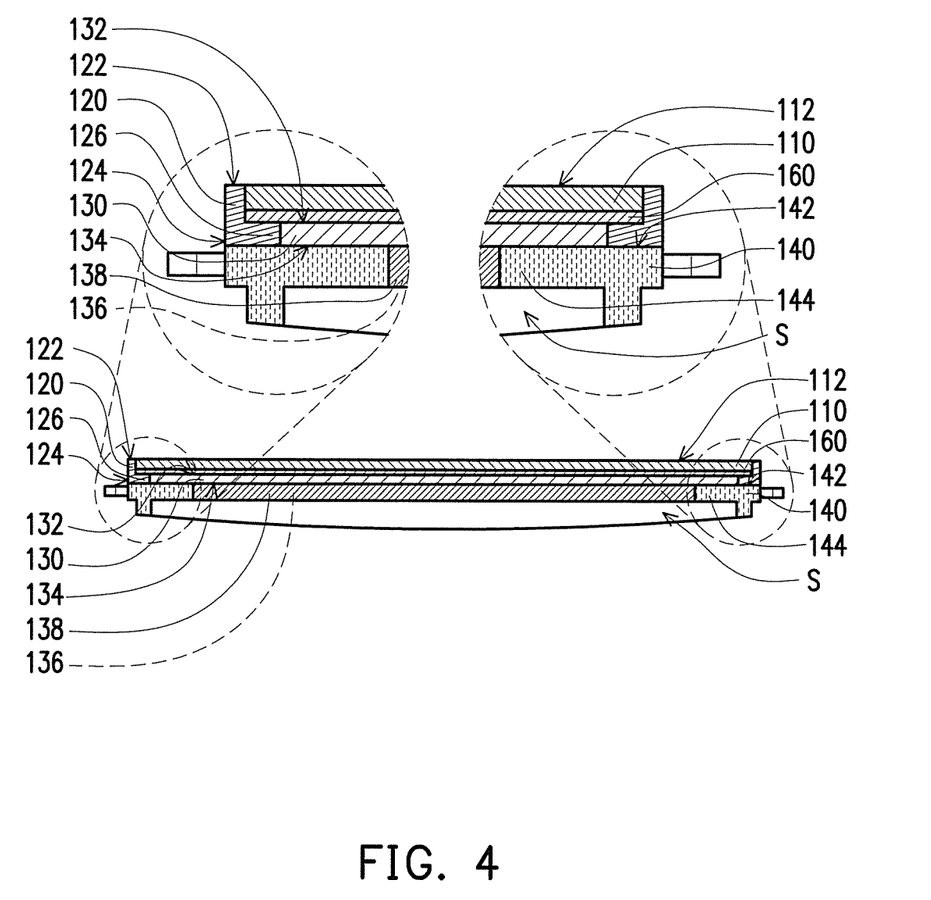
FIG. 4 is a schematic cross-sectional diagram illustrating the liquid crystal display assembly depicted in FIG. 3.

FIG. 2A is an exploded diagram illustrating a liquid crystal display assembly according an embodiment of the disclosure. FIG. 2B is an exploded diagram illustrating an assembly of a liquid crystal display module and a backlight module depicted in FIG. 2A. FIG. 3 is a schematic diagram illustrating the liquid crystal display assembly depicted in FIG. 2A. FIG. 4 is a schematic cross-sectional diagram illustrating the liquid crystal display assembly depicted in FIG. 3. Referring to FIG. 2A through FIG. 4, in the embodiment, the liquid crystal display assembly 100 is applicable to assemble with a circuit board 130. The liquid crystal display assembly 100 includes a liquid crystal display module 110, a supporting frame 120, a fixing frame 140, a plurality of fasteners 150 and a backlight assembly 160. The liquid crystal display module 110 can be a thin film transistor (TFT) liquid crystal display module, although the type of the liquid crystal display module 110 is not limited in the disclosure.

Specifically, the liquid crystal display module 110 has a display surface 112. The backlight assembly 160 has a light guide plate 160c. The supporting frame 120 has a top portion 122 and a bottom portion 124 opposite to the top portion 122. The light guide plate 160c of the backlight assembly 160 is fixed at the top portion 122 of the supporting frame 120. The liquid crystal display module 110 is stacked up on the light guide plate 160c of the backlight assembly 160, and is disposed on the top portion 122 of the supporting frame 120. To be more specific, the liquid crystal display module 110 is mounted to inner sides of the supporting frame 120 from the top portion 122 of the supporting frame 120, so that the liquid crystal display module 110 is fixed by the supporting frame 120 that surrounds the liquid crystal display module 110. The material of the supporting frame 120 can be plastic, although the disclosure is not limited thereto.

In general, the liquid crystal display substantially includes the liquid crystal display module 110 and the backlight assembly 160. In other words, the liquid crystal display module 110 needs to cooperate with the backlight assembly 160 so as to be used. The liquid crystal display utilizes the display surface 112 of the liquid crystal display module 110 to display images and the backlight assembly 160 is configured to provide a backlight source to the liquid crystal display module 110, as shown in FIG. 2A. Additionally, referring to FIG. 2B, in the embodiment, the liquid crystal display module 110 includes polarizer elements 110a and a liquid crystal display unit 110b. The polarizer elements 110a are disposed on the liquid crystal display unit 110b (such as, are disposed on the upper and lower surfaces of the liquid crystal display unit 110b), in which the liquid crystal display unit 110b often includes two substrates and components located between the two substrates such as a liquid crystal layer, an electrode layer, a color filter layer and an alignment layer etc. On the other hand, the backlight assembly 160 of the embodiment includes a light source (not shown), a plurality of optical films 160a and 160b, the light guide plate 160c and a reflector 160d, in which the optical films 160a and 160b can be a diffuser and a brightness enhancement film (BEF) which are disposed on a surface of the light guide plate 160c (such as the light emitting surface of the light guide plate 160c), and the reflector 160d disposed on another surface of the light guide plate 160c (such as the reflecting surface of the light guide plate 160c) opposite to the optical films 160a and 160b can be configured to reflect the light emitted from the light source disposed on the lateral sides of the light guide plate 160c to the light emitting surface of the light guide plate 160c. The light is emitted out of the backlight assembly 160 through the optical films 160a and 160b, so as to provide the required brightness for the liquid crystal display module 110 to display images.

It can be seen that the liquid crystal display is actually constituted by many components. Therefore, in this embodiment, the backlight assembly 160 and the liquid crystal display module 110 are sequentially mounted to the inner sides of the supporting frame 120 from the top portion 122 of the supporting frame 120, so that the liquid crystal display module 110 and the backlight assembly 160 are fixed by the supporting frame 120 that surrounds the liquid crystal display module 110 and the backlight assembly 160, thereby omitting the holding frames utilized in the processes of manufacturing and assembling the conventional liquid crystal display. In other words, the optical films 160a and 160b, the light guide plate 160c and the reflector 160d of the backlight assembly 160 are directly fixed at the supporting frame 120, and the polarizer element 110a and the liquid crystal display unit 110b of the liquid crystal display module 110 are also directly fixed at the supporting frame 120, as shown in FIG. 2A. The backlight assembly 160 and the liquid crystal display module 110 may not include additional frames to fix the elements thereof, respectively. In other embodiments, the liquid crystal display module 110 and the backlight assembly 160 may vary the configuration of the polarizer element 110a or the optical films 160a, 160b (such as increase or decrease the amount thereof) or dispose a fixing element (such as a tape) between the components according to an actual requirement, in which the afore-described component may also be directly fixed at the supporting frame 120. Since the backlight assembly 160 and the liquid crystal display module 110 do not include any additional frames, the backlight assembly 160 and the liquid crystal display module 110 are fixed by the supporting frame 120, thereby reducing the thickness of the liquid crystal display assembly 100.

On the other hand, in the embodiment, the supporting frame 120 has a supporting portion 126. The supporting portion 126 extends from the bottom portion 124 of the supporting frame 120 and surrounds the inner sides of the supporting frame 120. Therefore, when the liquid crystal display module 110 and the backlight assembly 160 are mounted to the inner sides of the supporting frame 120 from the top portion 122 of the supporting frame 120, the backlight assembly 160 is propped against the supporting portion 126 of the bottom portion 124 of the supporting frame 120, so that the inner sides and the supporting portion 126 of the supporting frame 120 can provide the fixing effect. After the liquid crystal display module 110 and the backlight assembly 160 are mounted to the inner sides of the supporting frame 120 and fixed at the supporting frame 120, the circuit board 130 is mounted to the bottom portion 124 of the supporting frame 120 and is electrically connected to the liquid crystal display module 110, and the circuit board 130 faces the rear side 162 of the backlight assembly 160 opposite to the display surface 112. As such, the circuit board 130 may also provide the fixing effect from the bottom of the liquid crystal display module 110 and the backlight assembly 160.

In the embodiment, the circuit board 130 has a first surface 132 and a second surface 134 opposite to the first surface 132. The first surface 132 of the circuit board 130 faces the rear side 162 of the backlight assembly 160 and is mounted to the bottom portion 124 of the supporting frame 120, so as to provide the fixing effect from the bottom of the liquid crystal display module 110 and the backlight assembly 160. The circuit board 130 has a plurality of electronic components 136 located at the second surface 134. The electronic components 136 located at the second surface 134 are normally shielded by a cover 138, although the disclosure is not limited thereto.

After the circuit board 130 is mounted to the bottom portion 124 of the supporting frame 120, the fixing frame 140 is mounted to the bottom portion 124 of the supporting frame 120 so as to fix the circuit board 130 (located at the bottom portion 124 of the supporting frame 120) between the supporting frame 120 and the fixing frame 140, and the fixing frame 140 surrounds the electronic components 136 located at the second surface 134. The material of the fixing frame 140 can be metal, although the disclosure is not limited thereto. After the fixing frame 140 is mounted to the bottom portion 124 of the supporting frame 120, the fixing frame 140 is fastened to the bottom portion 124 of the supporting frame 120 by the fasteners 150. Accordingly, the liquid crystal display assembly 100 has a higher strength.

In the embodiment, the fixing frame 140 has a propping portion 144 extending from a top portion 142 of the fixing frame 140 and surrounding the inner sides of the fixing frame 140. After the fixing frame 140 is mounted to the bottom portion 124 of the supporting frame 120, the top portion 142 of the fixing frame 140 is in contact with the bottom portion 124 of the supporting frame 120. Therefore, the circuit board 130 mounted to the bottom portion 124 of the supporting frame 120 is located at the top portion 142 of the fixing frame 140, and the circuit board 130 is propped against the propping portion 144 extending from the top portion 142 of the fixing frame 140, so that the circuit board 130 is held by the fixing frame 140 and the supporting frame 120 so as to be fixed.

On the other hand, various positioning portions can be disposed on the bottom portion 124 of the supporting frame 120 and the top portion 142 of the fixing frame 140, so as to cooperate with an extending portion extended from the lateral sides of the circuit board 130 or the electronic components 136 located on the circuit board 130 to provide the positioning and fixing effects. In other words, a portion of the circuit board 130 is actually located between the supporting frame 120 and the fixing frame 140, so that the circuit board 130 is held by the fixing frame 140 and the supporting frame 120 so as to be fixed.

For example, referring to FIG. 1 and FIG. 2A, in the embodiment, the supporting frame 120 has a first positioning portion 128 located at the bottom portion 124 of the supporting frame 120, and the fixing frame 140 has a second positioning portion 146 located at the top portion 142 of the fixing frame 140. The first positioning portion 128 is corresponded to the second positioning portion 146 to form a positioning opening O1, and one of the electronic components 136 of the circuit board 130 fixed between the supporting frame 120 and the fixing frame 140, such as the electronic component 136a depicted in FIG. 1 and FIG. 2A, is located at the positioning opening O1.

The electronic component 136a can be a connector or a flexible printed circuit (FPC), although the type of the electronic component 136a is not limited in the disclosure. After the fixing frame 140 is mounted to the bottom portion 124 of the supporting frame 120, the positioning opening O1 formed by the first positioning portion 128 and the second positioning portion 146 can match the shape of the electronic component 136a, so that the electronic component 136a is located at the positioning opening O1. As such, the electronic component 136a is capable of connecting to other electronic devices or electronic elements.

In addition, the electronic component 136a located at the positioning opening O1 can be treated as being located between the supporting frame 120 and the fixing frame 140. Therefore, the supporting frame 120 and the fixing frame 140 that contact with each other are capable of holding the circuit board 130 by having the positioning opening O1 to fix the electronic component 136a located on the circuit board 130. Furthermore, the electronic component 136a located at the positioning opening O1 cannot move relative to the positioning opening O1. As such, the circuit board 130 is capable of being positioned between the supporting frame 120 and the fixing frame 140 by the electronic component 136a located at the positioning opening O1, so as to prevent the occurrence of movement relative to the supporting frame 120 and the fixing frame 140 during the installation process.

Similarly, besides the electronic component 136a located at the second surface 134, the circuit board 130 can also generate the afore-described positioning and fixing effects by having the extending portion 136b to cooperate with the positioning portion located at the bottom portion 124 of the supporting frame 120 or the top portion 142 of the fixing frame 140, and the extending portion 136b extending to the outer sides of the supporting frame 120 and the fixing frame 140 can also be served as the component for positioning or fixing the liquid crystal display assembly 100 in the subsequent applications of the liquid crystal display assembly 100, although the pattern and the purpose of the extending portion 136b are not limited in the disclosure, and the disposition of the extending portion 136b is also not limited in the disclosure.

Figure 5:
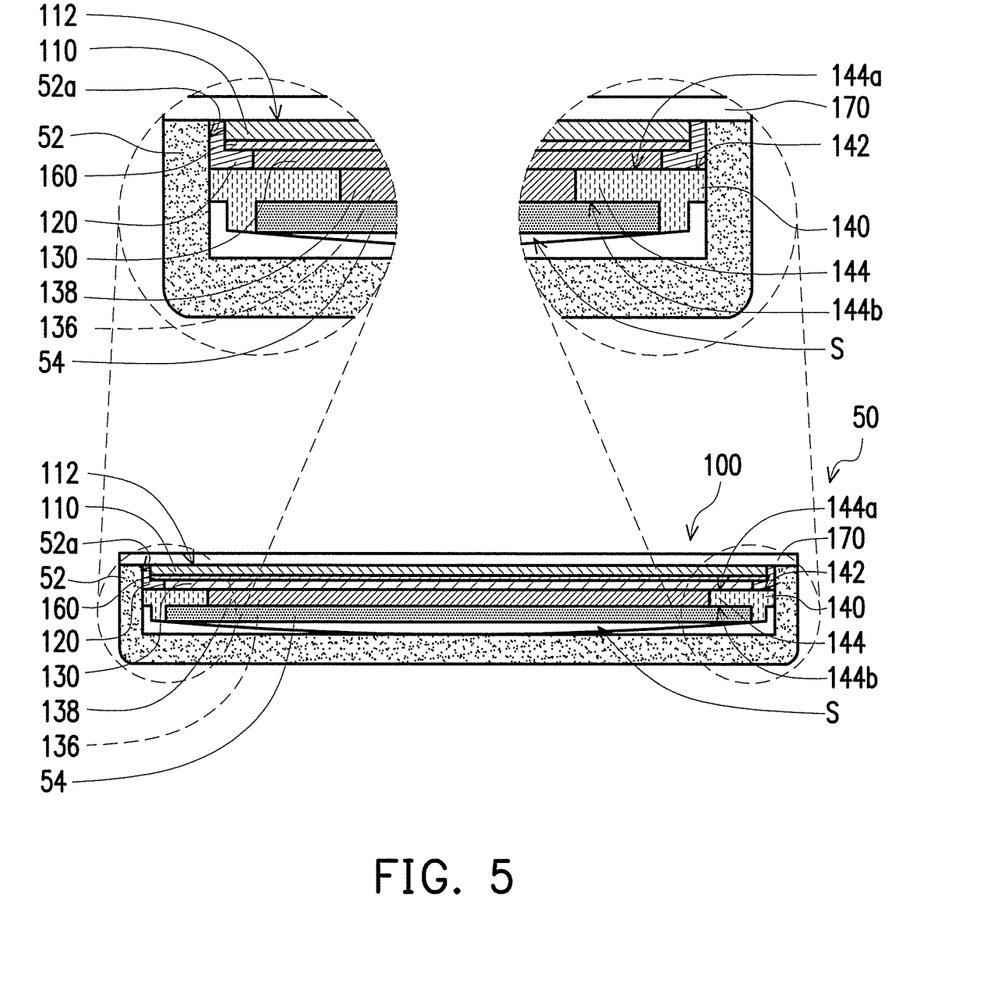
FIG. 5 is a schematic cross-sectional diagram illustrating the liquid crystal display assembly depicted in FIG. 3 being applied to an electronic device.

FIG. 5 is a schematic cross-sectional diagram illustrating the liquid crystal display assembly depicted in FIG. 3 being applied to an electronic device. Referring to FIG. 5, the liquid crystal display assembly 100 can be applied to an electronic device 50. In the embodiment, the electronic device 50 includes a housing 52, a battery 54 and the liquid crystal display assembly 100. For instance, the electronic device 50 can be a mobile phone or a smart phone, and the housing 52 can be the casing for the mobile phone or the smart phone, although the type of the electronic device 50 is not limited in the disclosure.

In the embodiment, the housing 52 has a mount opening 52a. The liquid crystal display assembly 100 is mounted into the housing 52, and the display surface 112 of the liquid crystal display assembly 100 is exposed by the mount opening 52a. In addition, the liquid crystal display assembly 100 further includes a touch panel 170, which is disposed on the display surface 112 of the liquid crystal display module 110 and is exposed by the mount opening 52a, so that the electronic device 50 has the touch-sensing effect. Moreover, the battery 54 is mounted into the housing 52 and faces to the circuit board 130, in which the battery 54 faces the second surface 134 of the circuit board 130, so that the battery 54 is able to be connected to the electronic components 136 to provide electricity to the liquid crystal display assembly 100, and the cover 138 covering a portion of the electronic components 136 can also prevent the battery 54 to contact with the electronic components 136 which causes damages.

Referring to FIG. 2A, FIG. 3 and FIG. 5, in the embodiment, the propping portion 144 has a front side 144a and a rear side 144b opposite to the front side 144a. The circuit board 130 is disposed on the top portion 142 of the fixing frame 140 and is propped against the front side 144a of the propping portion 144, while the battery 54 is mounted to the inner sides of the fixing frame 140 and is propped against the rear side 144b of the propping portion 144. In other words, the inner sides of the fixing frame 140 and the rear side 144b of the propping portion 144 extending from the top portion 142 of the fixing frame 140 can form an accommodating space S, and the battery 54 is located in the accommodating space S and is propped against the rear side 144b. In addition, the battery 54 can also be fixed in the accommodating space S of the fixing frame 140 by a back cover (not shown), although the disclosure is not limited thereto.

In the liquid crystal display assembly 100 of the disclosure, it can be seen that the liquid crystal display module 110 and the backlight assembly 160 are directly mounted to the top portion 122 of the supporting frame 120, and the fixing ability of the liquid crystal display module 110 and the backlight assembly 160 are further reinforced by mounting the circuit board 130 to the bottom portion 124 of the supporting frame 120. As such, the positioning frames 16a and 16b shown in FIG. 1 can be omitted in the liquid crystal display assembly 100, so that the liquid crystal display assembly 100 has a preferable strength and a thinner thickness. By applying the liquid crystal display assembly 100 to the electronic device 50, the strength of the electronic device 50 can also be enhanced and the thickness of the electronic device 50 can be reduced. In addition, by having the battery 54 to mount into the accommodating space S which is formed by the inner sides of the fixing frame 140 and the rear side 144b of the propping portion 144, the completed electronic device 50 is no longer needed to increase additional space to accommodate the battery 54 in the thickness direction. Accordingly, the electronic device 50 has a preferable strength and a thinner thickness.

In summary, the liquid crystal display assembly provided in the disclosure can be applied to the electronic device, in which the liquid crystal display module and the backlight assembly thereof are mounted from the top portion of the supporting frame to the inner sides of the supporting frame, so that the liquid crystal display module is fixed by the supporting frame that surrounds the liquid crystal display module, and the circuit board is mounted to the bottom portion of the supporting frame. As such, the liquid crystal display module and the backlight assembly can be fixed by the supporting frame and the circuit board, so as to omit using other holding frames that are configured to fix, and to reduce the thickness of the liquid crystal display assembly. In addition, the fixing frame is mounted to the bottom portion of the supporting frame, so that the circuit board can be held by the fixing frame and the supporting frame so as to be fixed. Accordingly, the liquid crystal display assembly and the electronic device using the same have thinner thickness and preferable strength.

Although the disclosure has been described with reference to the above embodiments, it is apparent to one of the ordinary skill in the art that modifications to the described embodiments may be made without departing from the spirit of the disclosure. Accordingly, the scope of the disclosure will be defined by the attached claims not by the above detailed descriptions.

What is claimed is:

1. A liquid crystal display assembly, applicable to assemble with a circuit board, the liquid crystal display assembly comprising:
    a liquid crystal display module, having a display surface;
    a backlight assembly, having a light guide plate; and
    a supporting frame, having a top portion and a bottom portion opposite to the top portion, the light guide plate of the backlight assembly fixed at the top portion of the supporting frame, and the liquid crystal display module stacked up on the light guide plate of the backlight assembly and disposed on the top portion of the supporting frame, wherein the liquid crystal display module is mounted to inner sides of the supporting frame from the top portion of the supporting frame and contacting the inner sides of the supporting frame, so that the liquid crystal display module is fixed only by the supporting frame that surrounds and contacts the liquid crystal display module, the circuit board is applicable to mount to the bottom portion of the supporting frame and to electrically connect to the liquid crystal display module, and the circuit board faces a rear side of the backlight assembly opposite to the display surface.

2. The liquid crystal display assembly according to claim 1, wherein the backlight assembly further comprises:
    a plurality of optical films, disposed on a surface of the light guide plate; and
    a reflector, disposed on another surface of the light guide plate opposite to the optical films.

3. The liquid crystal display assembly according to claim 2, wherein the optical films, the light guide plate and the reflector of the backlight assembly are directly fixed at the supporting frame.

4. The liquid crystal display assembly according to claim 1, wherein the supporting frame has a supporting portion, the supporting portion extends from the bottom portion of the supporting frame and surrounds the inner sides of the supporting frame, and the backlight assembly is propped against the supporting portion, so that the liquid crystal display module and the backlight assembly are fixed by the supporting frame that surrounds the liquid crystal display module and the backlight assembly.

5. The liquid crystal display assembly according to claim 1, wherein the circuit board has a first surface and a second surface opposite to the first surface, the first surface of the circuit board faces the rear side of the backlight assembly and the circuit board is mounted to the bottom portion of the supporting frame, and the circuit board has a plurality of electronic components located at the second surface.

6. The liquid crystal display assembly according to claim 5, further comprising:
    a fixing frame, mounted to the bottom portion of the supporting frame so as to fix the circuit board between the supporting frame and the fixing frame, and the fixing frame surrounding the electronic components located at the second surface.

7. The liquid crystal display assembly according to claim 6, further comprising:
    a plurality of fasteners, fastening the fixing frame to the bottom portion of the supporting frame.

8. The liquid crystal display assembly according to claim 7, wherein the fixing frame has a propping portion, the propping portion extends from a top portion of the fixing frame and surrounds inner sides of the fixing frame, and the circuit board is located at the top portion of the fixing frame and is propped against the propping portion, so that the circuit board is held by the fixing frame and the supporting frame so as to be fixed.

9. The liquid crystal display assembly according to claim 6, wherein the supporting frame has a first positioning portion located at the bottom portion of the supporting frame, the fixing frame has a second positioning portion located at the top portion of the fixing frame, the first positioning portion is corresponded to the second positioning portion to form a positioning opening, and one of the electronic components of the circuit board fixed between the supporting frame and the fixing frame is located at the positioning opening.

10. An electronic device, comprising:
    a housing, having a mount opening; and
    a liquid crystal display assembly, applicable to assemble with a circuit board and mounted into the housing, the liquid crystal display assembly comprising:
        a liquid crystal display module, having a display surface, wherein the display surface is exposed by the mount opening;
        a backlight assembly, having a light guide plate; and
        a supporting frame, having a top portion and a bottom portion opposite to the top portion, the light guide plate of the backlight assembly fixed at the top portion of the supporting frame, and the liquid crystal display module stacked up on the light guide plate of the backlight assembly and disposed on the top portion of the supporting frame, wherein the liquid crystal display module is mounted to inner sides of the supporting frame from the top portion of the supporting frame and contacting the inner sides of the supporting frame, so that the liquid crystal display module is fixed only by the supporting frame that surrounds and contacts the liquid crystal display module, the circuit board is applicable to mount to the bottom portion of the supporting frame and to electrically connect to the liquid crystal display module, and the circuit board faces a rear side of the backlight assembly opposite to the display surface.

11. The electronic device according to claim 10, wherein the backlight assembly further comprises:
a plurality of optical films, disposed on a surface of the light guide plate; and
a reflector, disposed on another surface of the light guide plate opposite to the optical films.

12. The electronic device according to claim 11, wherein the optical films, the light guide plate and the reflector are directly fixed at the supporting frame.

13. The electronic device according to claim 10, wherein the supporting frame has a supporting portion, the supporting portion extends from the bottom portion of the supporting frame and surrounds the inner sides of the supporting frame, and the backlight assembly is propped against the supporting portion, so that the liquid crystal display module and the backlight assembly are fixed by the supporting frame that surrounds the liquid crystal display module and the backlight assembly.

14. The electronic device according to claim 10, wherein the circuit board has a first surface and a second surface opposite to the first surface, the first surface of the circuit board faces the rear side of the backlight assembly and the circuit board is mounted to the bottom portion of the supporting frame, and the circuit board has a plurality of electronic components located at the second surface.

15. The electronic device according to claim 14, wherein the liquid crystal display assembly further comprises a fixing frame mounted to the bottom portion of the supporting frame so as to fix the circuit board between the supporting frame and the fixing frame, and the fixing frame surrounds the electronic components located at the second surface.

16. The electronic device according to claim 15, wherein the liquid crystal display assembly further comprises a plurality of fasteners to fasten the fixing frame to the bottom portion of the supporting frame.

17. The electronic device according to claim 15, wherein the fixing frame has a propping portion, the propping portion extends from a top portion of the fixing frame and surrounds inner sides of the fixing frame, and the circuit board is located at the top portion of the fixing frame and is propped against the propping portion, so that the circuit board is held by the fixing frame and the supporting frame so as to be fixed.

18. The electronic device according to claim 15, further comprising:
a battery, mounted into the housing and facing the circuit board, wherein the propping portion has a front side and a rear side opposite to the front side, the circuit board is disposed on the top portion of the fixing frame and is propped against the front side of the propping portion, and the battery is disposed on the inner sides of the fixing frame and is propped against the rear side of the propping portion.

19. The electronic device according to claim 15, wherein the supporting frame has a first positioning portion located at the bottom portion of the supporting frame, the fixing frame has a second positioning portion located at the top portion of the fixing frame, the first positioning portion is corresponded to the second positioning portion to form a positioning opening, and one of the electronic components of the circuit board fixed between the supporting frame and the fixing frame is located at the positioning opening.

* * * * *